(12) United States Patent
Visser et al.

(10) Patent No.: US 8,079,634 B2
(45) Date of Patent: Dec. 20, 2011

(54) SEALED AFT CAVITY DRAG REDUCER

(75) Inventors: Kenneth Dale Visser, Potsdam, NY (US); Kevin Grover, Potsdam, NY (US); Luis Eduardo Marin, Plattsburgh, NY (US)

(73) Assignee: Clarkson University, Potsdam, NY (US)

(*) Notice: Subject to any disclaimer, the term of this patent is extended or adjusted under 35 U.S.C. 154(b) by 0 days.

(21) Appl. No.: 11/586,489

(22) Filed: Oct. 25, 2006

(65) Prior Publication Data
US 2011/0221231 A1 Sep. 15, 2011

Related U.S. Application Data

(60) Provisional application No. 60/730,028, filed on Oct. 26, 2005.

(51) Int. Cl.
*B62D 35/00* (2006.01)
(52) U.S. Cl. .................. 296/180.4; 296/180.1
(58) Field of Classification Search ............... 296/180.1, 296/180.2, 180.4
See application file for complete search history.

(56) References Cited

U.S. PATENT DOCUMENTS

| | | | | |
|---|---|---|---|---|
| 4,451,074 A * | 5/1984 | Scanlon | ...... | 296/180.4 |
| 4,682,808 A * | 7/1987 | Bilanin | ...... | 296/180.4 |
| 4,818,015 A * | 4/1989 | Scanlon | ...... | 296/180.1 |
| 5,058,945 A * | 10/1991 | Elliott et al. | ...... | 296/180.5 |
| 5,498,059 A * | 3/1996 | Switlik | ...... | 296/180.1 |
| 6,092,861 A * | 7/2000 | Whelan | ...... | 296/180.2 |
| 6,485,087 B1 * | 11/2002 | Roberge et al. | ...... | 296/180.5 |
| 6,595,578 B1 * | 7/2003 | Calsoyds et al. | ...... | 296/180.4 |
| 6,666,498 B1 * | 12/2003 | Whitten | ...... | 296/180.4 |
| 6,799,791 B2 * | 10/2004 | Reiman et al. | ...... | 296/180.1 |
| 6,959,958 B2 * | 11/2005 | Basford | ...... | 296/180.1 |
| 7,207,620 B2 * | 4/2007 | Cosgrove et al. | ...... | 296/180.4 |
| 2003/0205913 A1 * | 11/2003 | Leonard | ...... | 296/180.4 |
| 2007/0001481 A1 * | 1/2007 | Breidenbach | ...... | 296/180.1 |

* cited by examiner

*Primary Examiner* — Jason S Morrow
(74) *Attorney, Agent, or Firm* — Gerow D. Brill

(57) ABSTRACT

A drag reducing device utilizing sealed aft cavities designed to limit interference with existing truck and trailer designs is described. The invention comprises one or more sealed aft cavities affixed to the rear of a traditional commercial straight truck or trailer, or any other blunt (or mostly blunt) aft faced vehicle. A means is provided by which the device is stowed to allow normal operation of the straight truck, trailer or vehicle. Drag is reduced by the streamlining of the rear of the vehicle, postponing and narrowing the flow separation downstream of the trailing edge as well as increasing the pressure on the back of the vehicle with the open to the rear, sealed aft cavity. The concept described focuses on the utilization of (a) sealed aft cavity(ies) to limit the effects of blunt body drag and the means for attachment and stowage for loading and unloading cargo.

40 Claims, 8 Drawing Sheets

Figure 1 Rear View of Trailer with No Device

Figure 2. Rear View of Device Fully Deployed

Figure 3. Isometric View of Figure 2

Figure 4. Rear View of Trailer with Device Stowed and Doors Open

SEALED AFT CAVITY DRAG REDUCER

CROSS REFERENCE

This application is related to provisional application No. 60/730,028 filed on Oct. 26, 2005 entitled Sealed Aft Cavity Drag Reducer.

FIELD OF INVENTION

This invention relates to drag reduction on vehicles, such as tractor trailer combinations, delivery vehicles, recreational vehicles, buses, vans or any vehicle that has an inherently blunt or flat aft face, and the attachment of aft devices and more particularly to open aft cavities used in such devices and the means to attach and stow such a device for minimum impact on loading and unloading.

BACKGROUND OF INVENTION

It is known that a significant amount of air drag results when a vehicle travels over a roadway. This is due to an area of low pressure created at the rear end of the vehicle. For example, with a tractor-trailer type vehicle, the air makes a sharp bend around the squared-off back of the trailer, thus causing turbulence and drag. To overcome this problem, engine power is required and therefore fuel. Furthermore, the turbulence also causes poor visibility in rainy conditions and, an accumulation of dirt on the back of trailers, and a tangible buffeting of vehicles that are following the tractor-trailer.

In the trucking industry, the aerodynamics of vehicles is a growing concern. Tests indicate that fuel savings from aerodynamic improvements are equivalent to fuel savings attained by a chassis weight reduction and require fewer services to maintain. The air resistance or aerodynamic drag of the vehicle increases the power needed by the engine as the speed increases. It is known that a tractor-trailer needs about 100 HP to overtake the air drag at a speed of 55 MPH. Approximately half the energy reaching the drive wheels is required to overcome air resistance at cruising speed. Tests reveal that the square back end contributes approximately to 30% of the air drag. Therefore, the addition of an aerodynamic device, such as a rear deflector, diminishes the air drag and results in lower fuel consumption.

This disclosure pertains to the increasing need for reduction in operating costs and conservation of fuel in the commercial trucking industry. Blunt body parasitic drag has long been acknowledged as having a large impact on the aerodynamically efficiency of commercial straight trucks and trailers. Some work from the published literature is presented first followed by a review of pertinent patents.

Sovran et al in *Aerodynamic Drag Mechanisms of Bluff Bodies and Road Vehicles*; Plenum Press, NY; 1978 reported that Mason and Beebe in Mason, Jr., W. T., and P. S. Beebe. "The Drag Related Flow Field Characteristics of Trucks and Buses." *Aerodynamic Drag Mechanisms of Bluff Bodies and Road Vehicles* General Motors Research Laboratories, 1978. pp. 45-93 examined several add-on devices aimed at increasing the base pressure of a tractor-trailer in 1976. They included vertical and horizontal splitter panels, guide vanes, and non-ventilated cavities. The vertical splitter panels were found to have little or no effect on the tractor-trailer drag. The turning vanes had an adverse effect on drag. Mason and Beebe surmised that the added drag of the turning vanes outweighed any gain from increased base pressure. The only device that showed positive results was the non-ventilated cavity design. Mason and Beebe varied the depth of the panels and found an optimum panel length of 0.55 m (21.8 inches) for a conventional 14.6 m (48 foot) trailer yielding an overall drag reduction of 5 percent.

Similar research by Hucho, W.; *Aerodynamics of Road Vehicles*; Butterworths, London; 1987 used a small minivan style vehicle in the 1970s to substantiate the drag reduction behavior of non-ventilated cavities. In 1985, Cooper reported in The Effect of Front Edge Rounding and Rear-Edge Shaping on the Aerodynamic Drag of Bluff Vehicles in Ground Proximity, SAE 850288 the results of extensive tests on detailed scaled models of a tractor trailer and a panel truck using rounded and beveled panels on the rear end of the vehicle. His results indicated an optimum reduction in the drag of 7-10% of the baseline model drag and indicated it was not unreasonable to expect this at full scale.

Many ideas regarding the passive reduction of drag on trailers have been patented and a review of the concepts most closely associated to the present idea is presented below in order to differentiate the novelty of the present idea from these previous concepts.

U.S. Pat. No. 4,006,932 in the name of McDonald (1977) claims an inflatable drag reducer for land vehicles. The device when inflated, however, does not form a large sealed aft cavity. Small cusp portions on all trailing edges form a large wall at the rear of the device, thus filling in the cavity. No provisions for removal of the device to allow entry to the rear of the trailer is mentioned or described.

U.S. Pat. No. 4,236,745 (Davis, 1980) utilizes the concept of a retractable or collapsible device of the fully enclosed surface type. The present proposed device is also collapsible, but not of the fully enclosed variety. Lechner, U.S. Pat. No. 5,375,903 (1994), also puts forth a self inflatable concept with stiffening supports. However this is also of the enclosed variety.

U.S. Pat. No. 4,142,755 by Keedy (1979) describes a class of aft devices that reduce the width and height of the aft end of the trailer with panels or surfaces to try to keep the flow attached to the proposed surface reducing the wake width and associated drag. The device of this disclosure is of the class of open-ended aft cavities.

Mulholland, in U.S. Pat. No. 4,458,936 (1984), employs rigid panels attached with hinged mechanisms to the rear of the trailer. These outer surfaces join together to form an apex behind the vehicle. The concept disclosed herein uses panels that can hinge if desired, but do not join together to form an enclosed exterior surface.

U.S. Pat. No. 4,682,808 was filed by Bilanin in 1985 on a variation of the cavity design concept that inset the end panels from the trailer perimeter. His claims indicated a drag reduction on the order of 10% is claimed. The Bilanin device includes three or four panels oriented in a box formation. Three of the panels (top and sides) are generally inset from the perimeter of the trailer base and that the bottom panel has no inset and is in line with the bottom of the trailer. All the panels are mounted perpendicular to the trailer base, however the Bilian patent does allow for inset angled side panels. This orientation of panels produces vortex structures in the area between the panel and the perimeter of the trailer in the manner of the intent of the Mason and Beebe splitter devices.

The optimum dimensions reported in the Bilanin publication were:

$$D/W=0.13, G/H=0.15, D/L=G/L=0.3$$

where
   D=plate inset from each of the sides of the trailer
   G=plate inset from the top of the trailer
   W=width of trailer;

H=height of trailer;
L=plate length

With these criteria, Bilanin claims that a 10.2% reduction in drag was achieved on a typical tractor-trailer with a base tractor-trailer $C_D$ of 0.6, however no test results have been published in the literature. Bilanin includes optimum ranges for the geometric ratios previously specified, in order to adjust for maximum efficiency of vortex capture and for structural members already existing on the trailer base. These ratio ranges are:

$$0.1 \leq D/W \leq 0.2, 0.1 \leq G/H \leq 0.2, 0.2 \leq D/L = G/L \leq 0.4$$

Bilanin also specifies that the length of the plates should be between 40" and 56". The disclosure described herein can use angled panels in the dimensional ranges specified by Bilanin, but the panels are not inset from the edge, as per Bilanin, and in particular, the resulting cavity for the present design is not one but two separately sealed cavities that enable a viable device for real world applications.

U.S. Pat. No. 6,485,087 in the name of Roberge (2002) depicts a three sided non-ventilated cavity formed from angled fins off the rear of the trailer, aligned with the edge of the trailer. The present concept also utilizes angled fins set to the trailer edge, however, a completely enclosed cavity is formed once the device is deployed, which is further subdivided using eight fins to form two separate and sealed cavities. It should be particularly noted that the method for storage of the device by Roberge places it between the opened doors and the sides of the trailer during loading and unloading. This requires a trailer with doors configured to provide clearance for said device. The present device strategy does not have this constraint. Lastly, no method of sealing the adjoining panels or of sealing the panels to the rear of the trailer is mentioned by Roberge. The present concept requires a sealed cavity to be effective.

U.S. Pat. No. 6,257,654 in the name of Bolvin (2001) describes a similar concept to U.S. Pat. No. 6,485,087, but does not form a sealed or non-ventilated cavity.

U.S. Pat. No. 6,595,578 in the name of Calsoyds et al. describes a truck after-body reduction device having two cavities with rounded bottoms facing rearward. The patent does not discuss sealing, lengths or angles or any specific geometry or any kind of folding or attachment mechanisms This disclosed invention uses a different approach to drag reduction and attachment methods, which, to the best of the authors' knowledge, has not previously been recognized. The disclosed device requires the rear cavity(ies) to be completely sealed and this is crucial to the functionality of the device. The current device also employs a unique method of stowage which can be used with rigid sided or collapsible sided devices and requires two separately sealed cavities.

SUMMARY OF INVENTION

The object of the present invention is concerned with providing an air drag-reducing device which overcomes the above-described problem. More specifically, this is achieved by providing an device which allows the panels to be moved outwardly from a drag reducing position to a position where the doors are in their fully retracted position adjacent to their associated sides of the vehicle.

A further object of the present invention is to provide a mechanism which will enable the panels to return back to their drag reducing position whenever the doors are hingedly moved from their retracted position to their end closing position.

The present invention therefore relates to an air drag reducing device for use with a vehicle having top and opposite lateral sides contiguous with a rear end formed of a pair of hingedly mounted rectangular doors movable from a closed position to an open position wherein the doors panels are respectively retracted adjacent to a corresponding side of the vehicle. The device has two sealed cavities and means associated with the cavities for positioning the cavities in a drag reducing position rearwardly of a corresponding closed door, wherein the side and top panels define an exemplary angle of about 15 degrees with the rearward projection of the cavities of the corresponding side of the vehicle while the bottom panel has an exemplary angle of approximately 7 degrees. Positioning means allow the cavities to be moved between the door and the vehicle side as the door is opened and moved to its retracted position.

The disclosed invention is an aft cavity drag reduction device for a vehicle with one or more cavities facing aft when in a deployed state. There is a supporting member on which each cavity is mounted and is connected to the vehicle body. There is a means for collapsing said one or more cavities. Additionally the cavities have a hinge and latch system by which the collapsed cavity(ies) are allowed to rotate near, or at, the centerline of the vehicle body, along the opening edge of one or more rear doors, and swing open with said door to lie alongside the vehicle when open into a retracted position. The cavities have a base panel; an outside panel; an inside panel; two other panels; and an open area. The cavities have a frustum shape with the inside panel normal to said base panel and the outside panel and the two other panels mounted at an angle less than normal with respect to the base panel so as to produce a open area with a smaller foot print than the base panel. The base panel is fastened, hinged and sealed to the outside panel, the inside panel, and the two other panels. The outside panel and the inside panel are also fastened and sealed to the two other panels. The outside panel and the two other panels are mounted at an angle between 0 degrees and 35 degrees. The outside panels and a first of the two other panels are mounted at an angle of 15 degrees (exemplary value) with respect to the base panel. The second of two other panels are mounted at an angle of 7 degrees (exemplary value) with respect to the base panel. The panels are made are made of a light rigid material such as: a composite fiber, a rigid plastic material; carbon fiber; aluminum; or wood. The seals are generally bulb type seals. The side panels and other panels are unfastened and the seals are broken when the device is put into a collapsed or retracted position. The cavities may be fastened and sealed between the respective inside panels when device is put into a deployed position.

The disclosed invention is also a method of drag reduction for a vehicle including: providing one or more aft facing cavities; mounting the cavities on to an aft portion of a vehicle body; and operating the cavities in a deployed position. The method further includes folding the cavities into a substantially flat collapsed position and operating the cavities in the collapsed position. The method further includes rotating the cavity(ies) in a collapsed position about a line near, or at, a centerline of the vehicle body, along the opening edge of one or more rear doors, and swinging the cavity(ies) with the doors to lie in a retracted position alongside the vehicle when open. Each cavity has: a base panel; an outside panel; an inside panel; two other panels; and an open area. The method further includes mounting the inside panel normal to the base panel; mounting the outside panel and the two other panels to the base panel at an angle less than normal with respect to the base panel so as to produce an open area with a smaller foot print than the base panel. The outside panel and the two other panels are mounted at an angle between 0 degrees and 35 degrees with respect to the base panel. The outside panels and a first of the two other panels are mounted at an angle of 15 degrees (exemplary value) with respect to the base panel. The second of two other panels are mounted at an angle of 7 degrees with respect to the base panel. The panels are made are made of a light rigid material such as: a composite fiber, a rigid plastic material; carbon fiber; aluminum; or wood. The method further includes: fastening and sealing the base panel to the outside panel; fastening and sealing the base panel to the inside panel; fastening and sealing the base panel to the two other panels; and fastening and sealing the outside panel and the inside panel to the two other panels. The method further includes unfastening the panels and breaking the seal when the device is put into the collapsed position or the retracted position. The method further includes fastening the panels and sealing the panels when the device is put into the deployed position.

BRIEF DESCRIPTION OF DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION

The invention comprises a device attached to the rear of any relatively blunt based vehicle including, but not limited to tractor trailer combinations, delivery vehicles, recreational vehicles and buses, vans or any vehicle that has any vehicle that has an inherently blunt or flat aft face. The aft of the vehicle is unmodified except to act an attachment point for the device. The device when deployed forms one or more sealed aft cavities that extend from the body of the vehicle rearward while maintaining legal length limits. When the rear doors of the vehicle are opened the device stows in such a way to have no impact on the normal operation of the vehicle. With the rear doors closed the device can be deployed or remain in a collapsed condition to facilitate parking and maneuvering. When the doors are open the device and the doors lie in a generally flat position on the respective sides of the vehicle. The device itself consists of either rigid fins constructed of traditional rigid materials, including composite materials, or of a flexible materials inflated via the trucks air system, any of which, when deployed, acts to form a sealed open cavity on the aft face and open to the aft direction. Utilizing an inflatable system eliminates majority of the work required to stow the device for loading and unloading of the trailer. A key aspect of the design is the framework of the device which attaches to and is hinged to the edge of each door near the centerline of the trailer. This allows the device to be stowed along side the trailer when the doors are in the open position and does not require any additional clearance between the doors of the trailer and the side of the trailer to stow the device for loading and unloading. It is also possible to eliminate the need for the framework by designing a replacement door that integrally incorporates the device. The use of a flexible inflatable material may also preclude the need for a framework.

Figure 1:
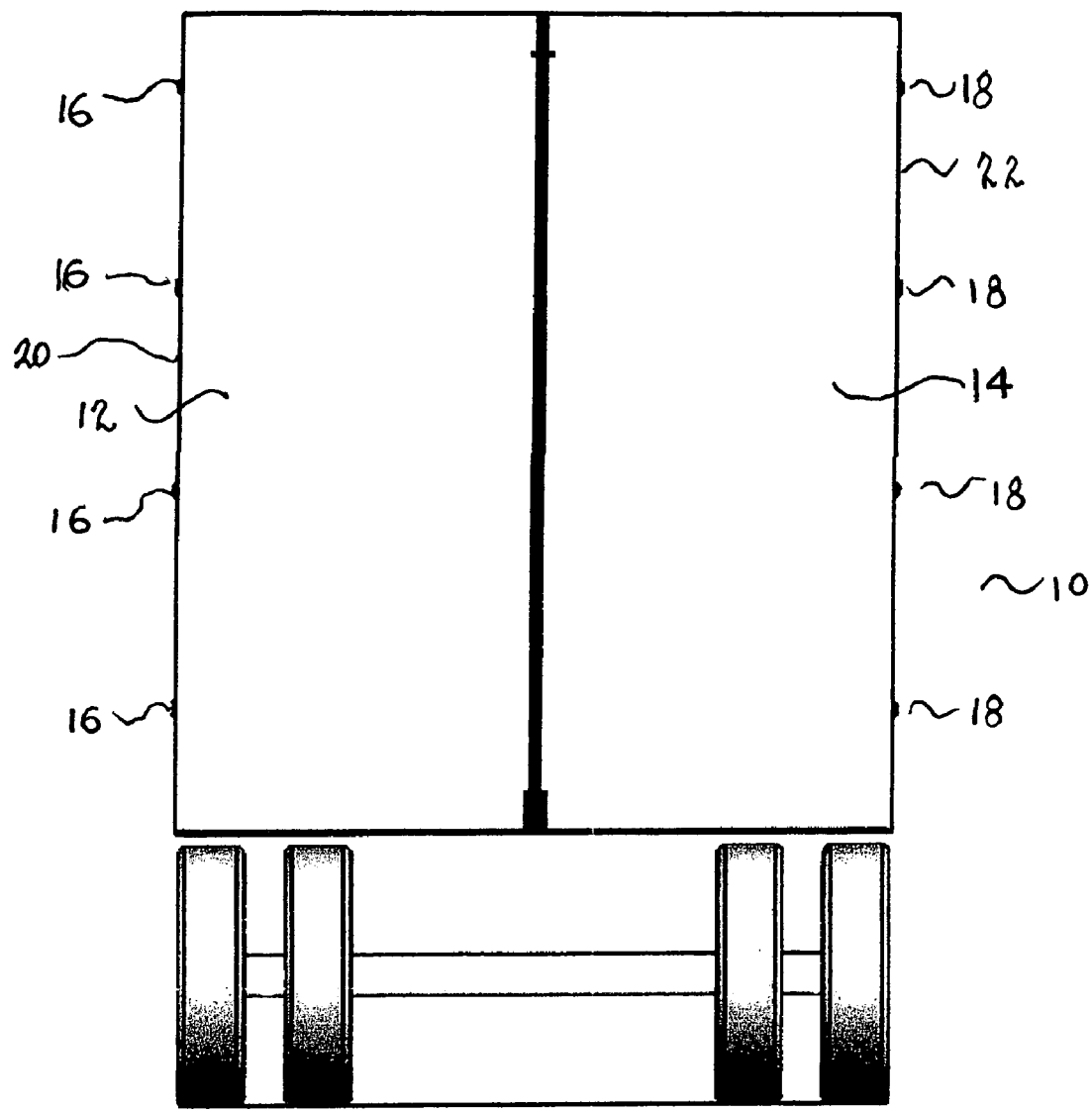
FIG. 1 illustrates a rear view of a truck or trailer without any drag reduction mounted hereon.

FIG. 1 illustrates a rear view of a trailer or truck 10 without a drag reduction device having doors 12 and 14 of rectangular shape in a closed position. The doors are respectfully mounted by means of hinges 16 on one side and 24 on the other side so as to move from their shown closed position to a fully retracted position where they are disposed parallel and adjacent to the opposite sides 20 and 22 of the vehicle.

Figure 2:
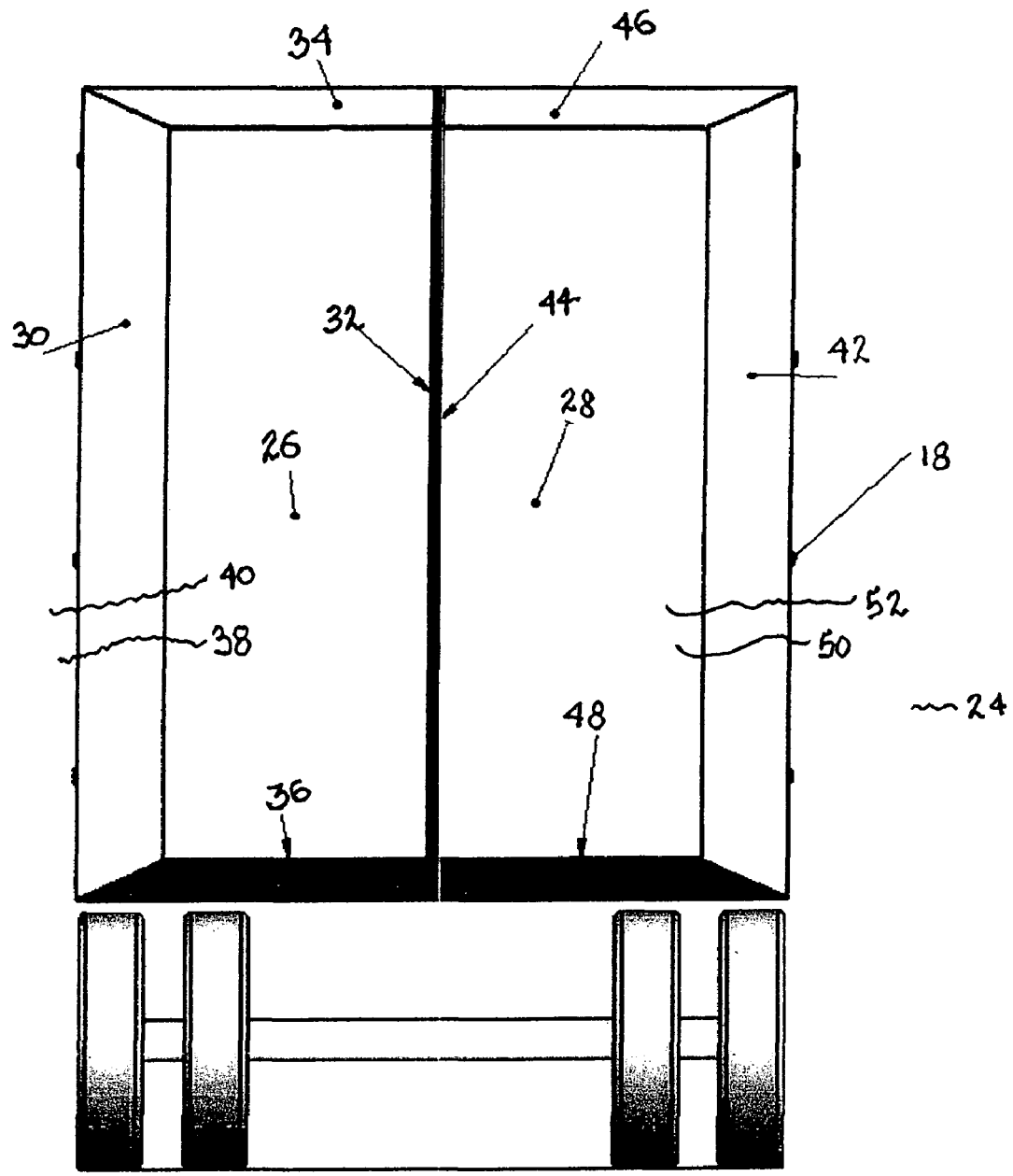
FIG. 2 illustrates the device in its deployed state for maximum drag reduction

The present invention is concerned with providing, at the rear of vehicle, an air drag reducing device 24 which includes a pair of cavities 26 and 28. As illustrated in FIG. 2, a first cavity 26, a left hand cavity, has a generally elongated rectangular shape with an outside edge 30 and an inside edge 32 (defining the long sides of the rectangle) and a pair of opposite sides 34 (at the top of the vehicle) and 48 (at the floor level of the vehicle) (defining the short sides of the rectangle). The first cavity has an open area 38 and a base panel 40. Each of these items, except the open area 38 (30, 32, 34 and 36) are defined as panels. The first cavity 26 has a frustum shape (a bath tub like structure), four sides, a base and an open face. The base of the cavity is fastened to a supporting member 15 at the intersection of the base panel 40 and the inside panel 32.

Similarly, the other cavity 28, a right cavity, as illustrated in FIG. 2 has a generally elongated rectangular shape with an outside edge 42 and an inside edge 44 (defining the long sides of the rectangle) and a pair of opposite sides 46 (at the top of the vehicle) and 48 (at the floor level of the vehicle) (defining the short sides of the rectangle). The right cavity has an open area 50 and a base panel 52. Each of these items, except the open area 50 (42, 44, 46 and 48) are defined as panels. The right cavity 28 has a frustum shape (a bath tub like structure), four sides, a base and an open face. The base of the cavity is fastened to a supporting member 15 at the intersection of the base panel 52 and the inside panel 56.

These cavities are preferably made of a light rigid material, such as a fiber composite material or a rigid plastic. The US Government's Federal Highway Administration waives certain length requirements on trucks, trailers and other vehicles, if aerodynamic devices, such as the cavities do not extend more than 5 feet beyond the vehicle and provided they do not have the strength, rigidity, or mass to damage a vehicle or injure a vehicle or in a vehicle that strikes a trailer so equipped from the rear. Additionally, such devices may not obscure tail lamps, turn signals, marker lamps, identification lamps, or any other required safety devices such as hazardous safety placards or conspicuity markings. The panels of are made of a light rigid material such as: a composite fiber, a rigid plastic material; carbon fiber; aluminum; or wood.

The performance of the cavities as a drag reduction system is very dependent upon the sealing of all panel edges in cavities 26 and 28. In particular, panels joining the base panel 40 to the side panels 30, 32, 34, and 36 for the left handed cavity as well as the base panel 52 to the side panels 42, 44, 46, and 48 for the right hand cavity. This sealing can be done by using ordinary bulb type seals, locking seals or a variety of sealing clamp strategies. The sealing needs to breakable when the cavities are moved to their storage positions, as discussed below.

Figure 3:
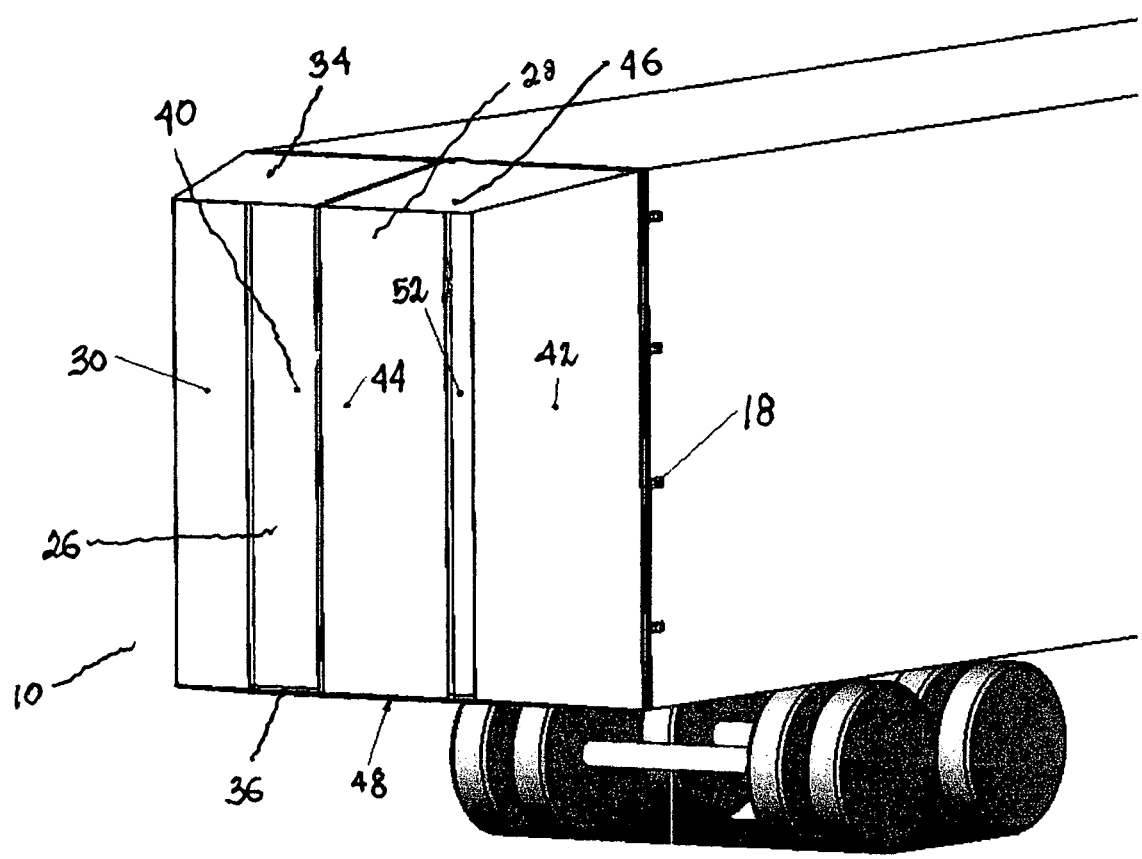
FIG. 3 illustrates an isometric view of FIG. 2 of the device in its deployed state.
Figure 8A:
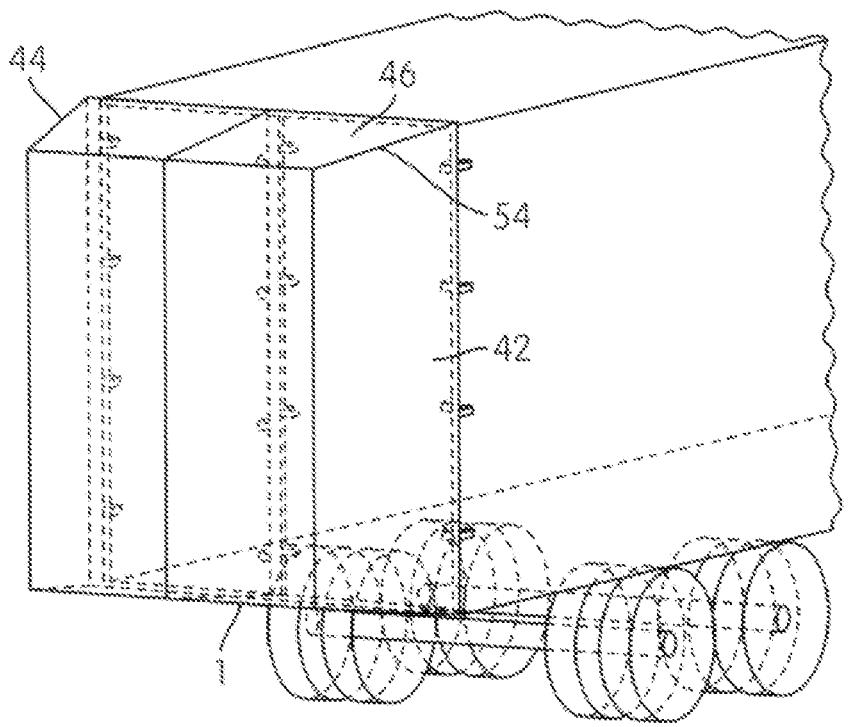
FIGS. 8a and 8b illustrate an isometric view of FIG. 2 with detail of sealed edges.
Figure 8B:
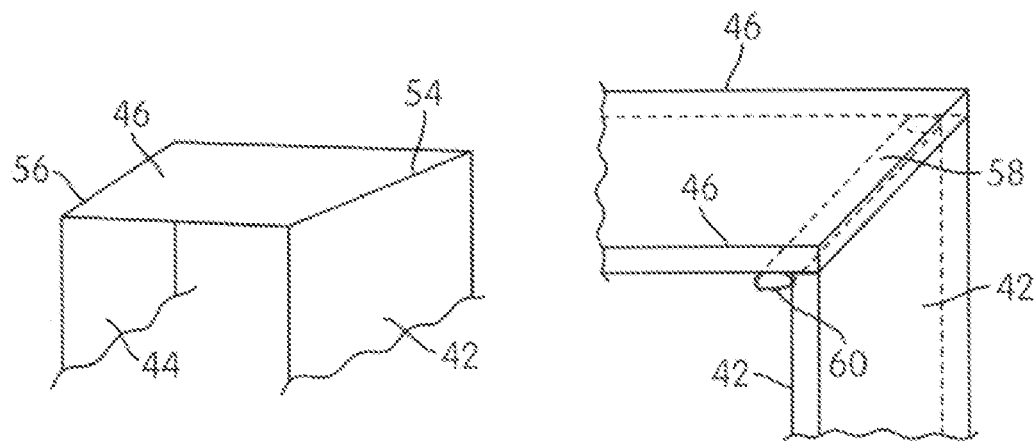

The detail in FIGS. 8a and 8b illustrate the nature of the sealing of the right aft cavity. Panel 42 is sealed to panel 46 with seal 54. Panel 44 is sealed to panel 46 with seal 56. Similar sealing takes place the interfaces between panel 46 and base panel 28; the bottom panel 48; and the bottom panel 48 and panels 42 and 54. Similar sealing is done between the same panels in the left cavity. Examples of possible sealing arrangement include a seal of the form of a bulb seal 58 or inside edge seal 60 or a similar seal that prevents any air from leaking from the cavity formed by the aft extending panels to the surrounding outer surface except out the aft open end of the cavity FIG. 3 illustrates an isometric view of the drag reducing device 10. There are two independent cavities 26 and 28, one on each door (not seen). Inside side panel 32 of left cavity 26 and inside side panel 44 of right cavity 28 are normal to the back of the vehicle and are in contact with each other. As discussed the base panel 40 and 52 of each cavity is fastened to a supporting member 15. The outside side panels 30 and 42 of each cavity 26 and 28 and the short side panels 34, 36, 46, and 48 may be angled inwardly in the range of 0 to 35 degrees, depending on the preferred geometry. An exemplary value for the outside panels 30 and 42 and the upper short side panels 34 and 46 is an angle of about 15 degrees. An exemplary value for the short side panels 36 and 48 is an angle of about 7 degrees. It is not required that all panels be angled the same amount. For optimum performance, cavities 26 and 28 need to have an open area facing rearward and have the sealed panel junctions as discussed above.

Each cavity has the base panel hinged to the inside panel, outside panel and the other two panels. The inside panel and the outside panel of each cavity is fastened to the two other panels.

Figure 4:
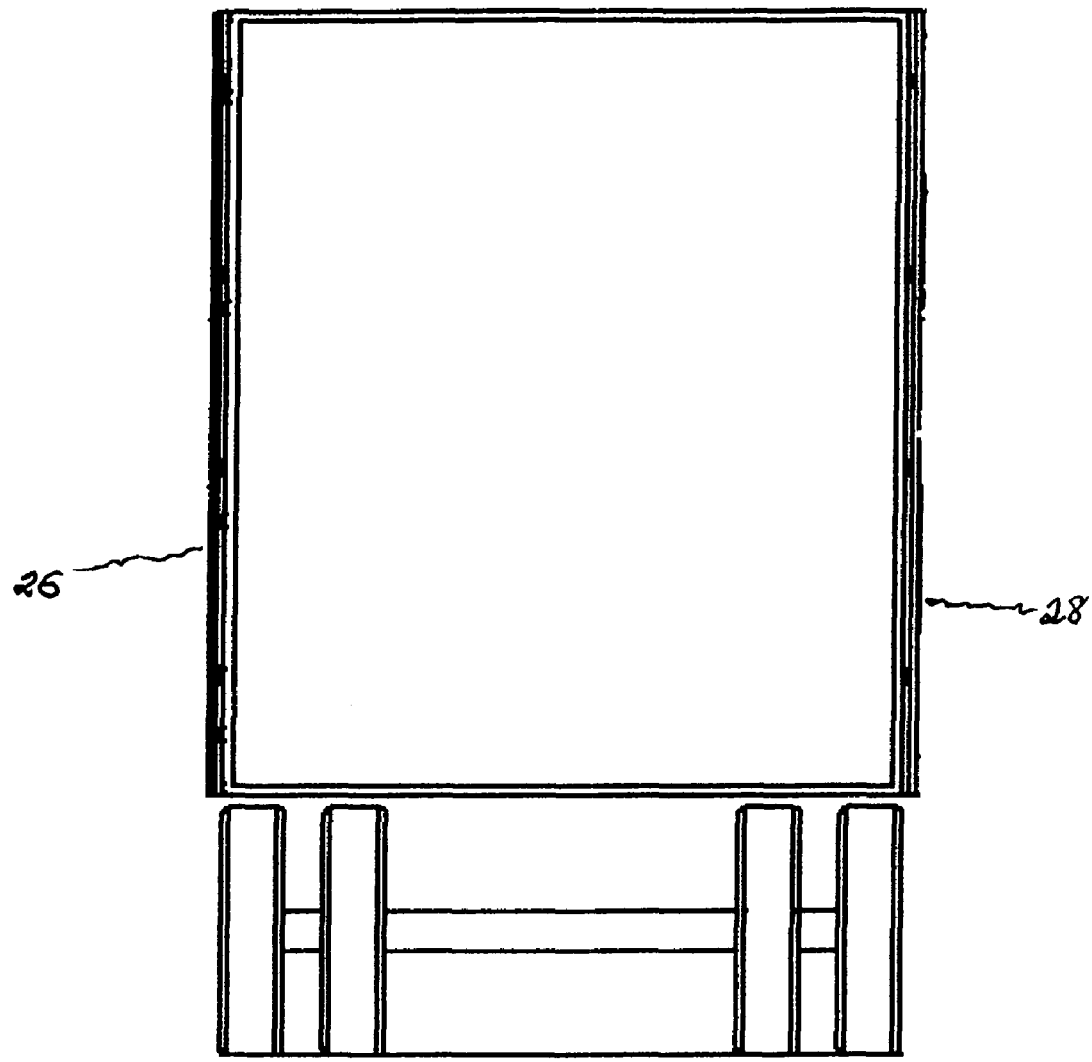
FIG. 4 illustrates a rear view of the device completely retracted wherein there is no hindrance of access to the load within the vehicle.

FIG. 4 depicts the device in the fully retracted state. Cavity 26 with its panels fold flat along the left side of the vehicle and in front of rear door 12. Cavity 28 with its panels fold flat along the left side of the vehicle and in front of rear door 14.

Figure 7:
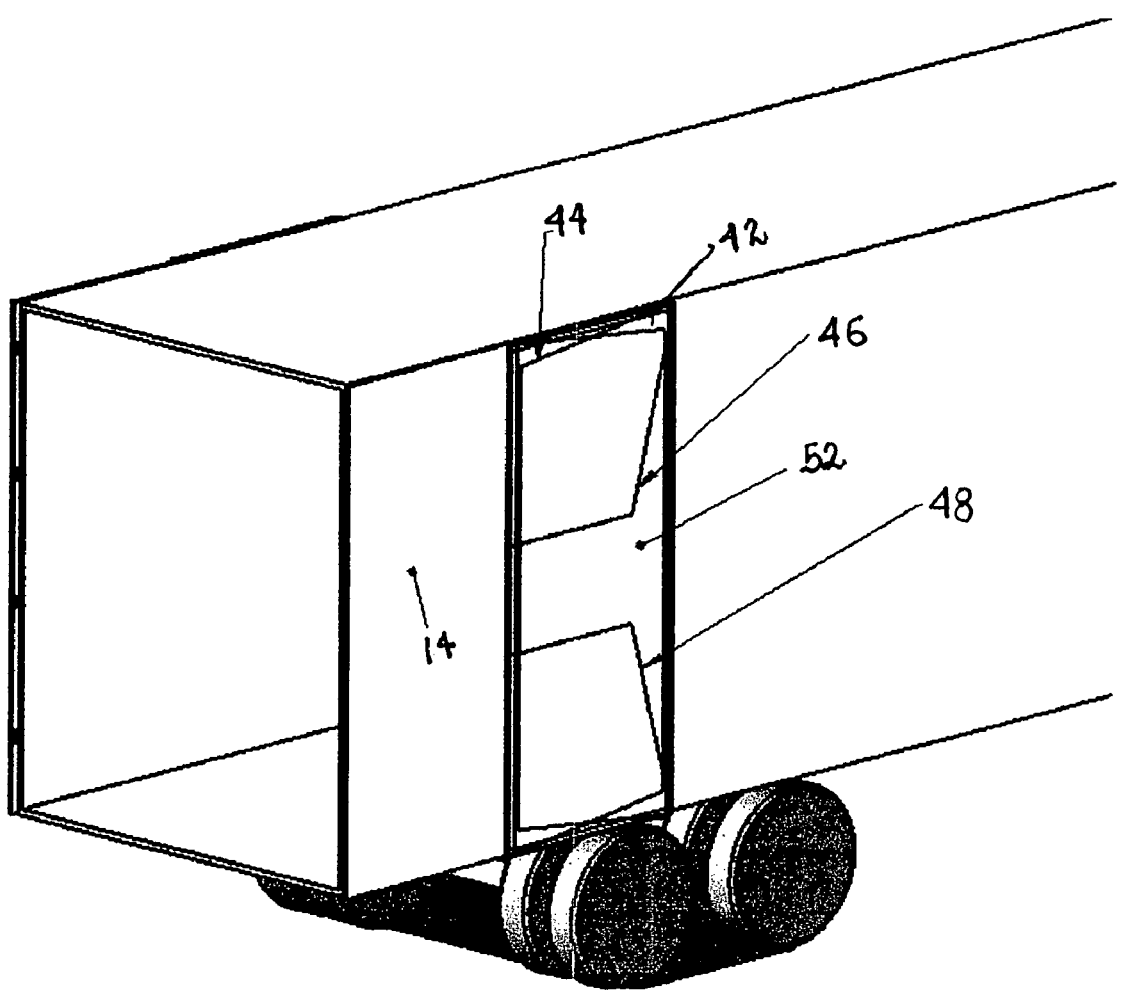

When access to the load in the vehicle is needed the device will be stowed as shown in FIG. 4 and FIG. 7.

For a rigid sided device a first example of the procedure of stowing would be:
 a. Fasteners are released and seals broken allowing the cavity to be folded together;
 b. Sides and top and base of each cavity are folded together against the respective back doors;
 c. Cavity units are released from door and swing out on hinge lines near the centerline of the vehicle;
 d. Vehicle door is opened and released from vehicle; and
 e. Entire assembly swings out of the way on the door hinge line whilst the cavity highline continues to move and then flat against the vehicle side.

For a rigid sided device a second example of the procedure would be:
 a. Cavity units are released from door and swing out on hinge lines near the centerline of the vehicle;
 b. Vehicle door is opened and released from vehicle; and
 c. Entire assembly swings out of the way on the door hinge line whilst the cavity highline continues to move and then against the vehicle side;
 d. Fasteners are released and seals broken allowing the cavity to be folded together;
 e. Sides and top and base of each cavity are folded together against the respective side of the vehicle.

For an inflatable version:
 a. Air valve for each separate cavity unit is released;
 b. Cavity units are deflated;
 c. Cavity units are released from door and swing out if necessary or simply remain attached to the door and reside against the door;
 d. Vehicle door is opened and released from vehicle; and
 e. Entire assembly swings out of the way and then flat against the vehicle side.

Figure 5:
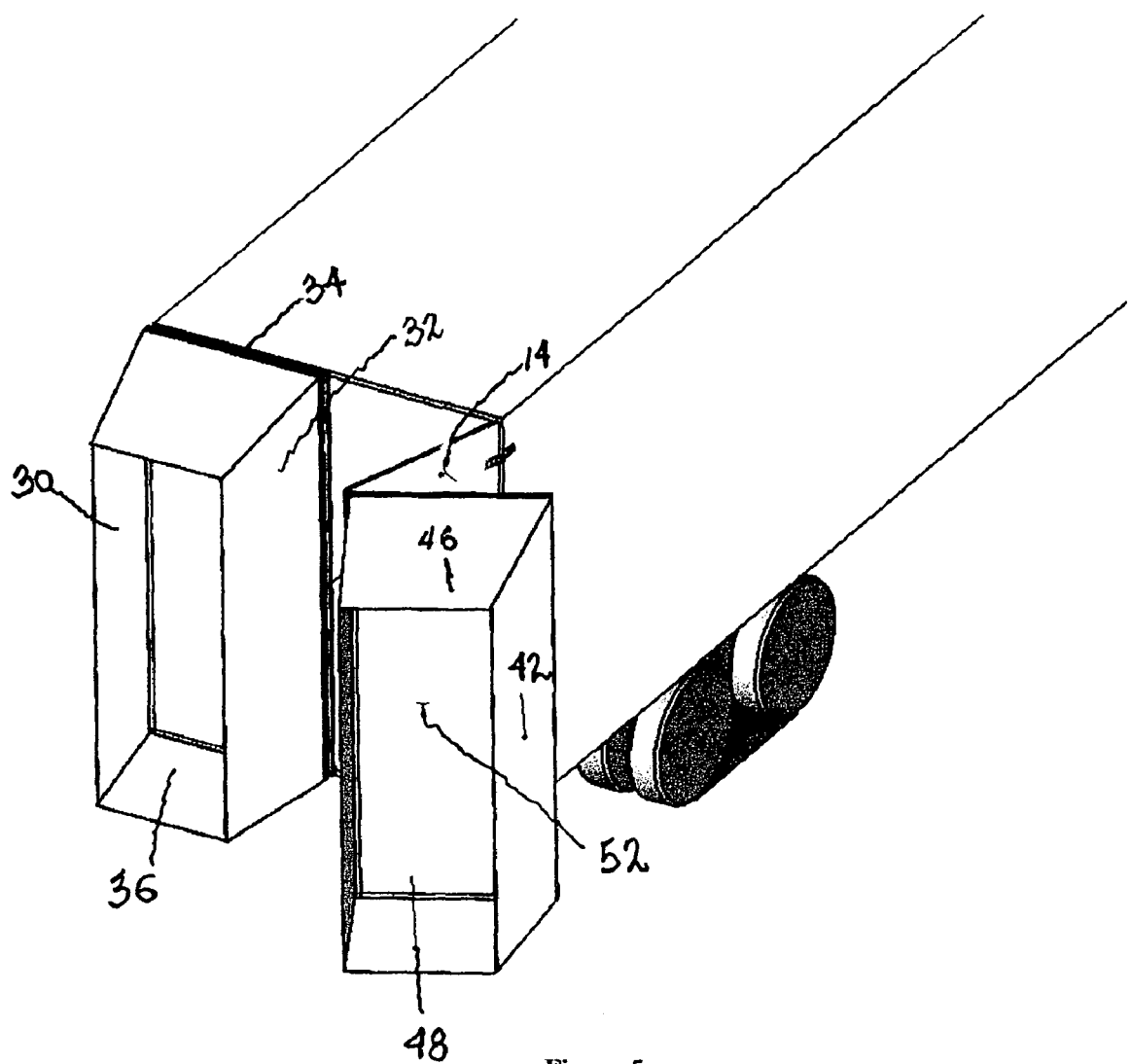
FIGS. 5 through 7 illustrate a sequence of views as the device moves from its deployed state as illustrated in FIG. 3 to its retracted state as illustrated in FIG. 7.
Figure 6:
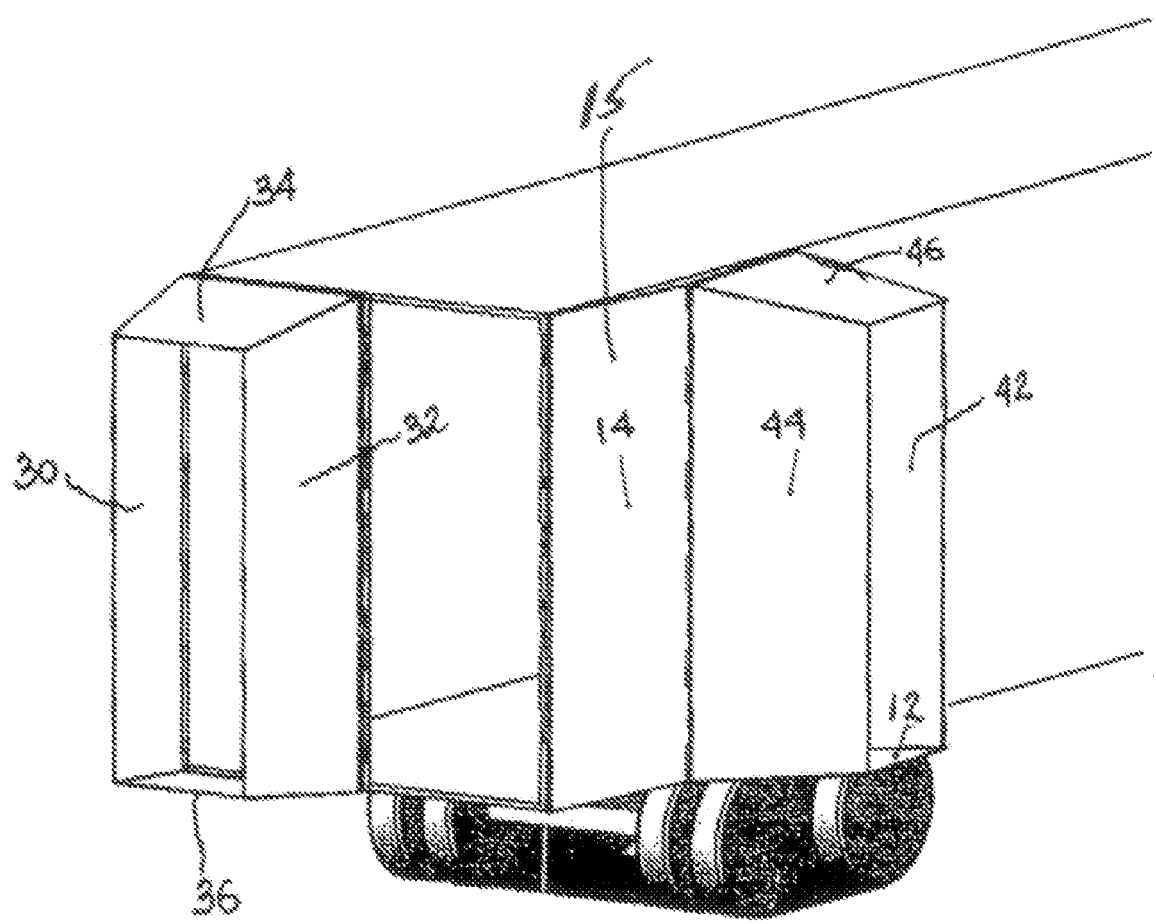

This motion is illustrated in FIG. 5 to FIG. 7 and contrasts with previous designs which tend to have hinge lines at or near the door hinge line. Access to the vehicle is now possible and unchanged from the original vehicle configuration. After load access is complete the rear doors are closed, the devices is placed into its original position and the panels are deployed. Additionally, there may be instances when it would be desirable to have the vehicle's doors closed, but have the drag reducing apparatus in a stowed position. Such instances include being in a crowded business district where multiple deliveries are being made and at the lower speed of travel with the inconvenience of moving the apparatus for each delivery outweighs any marginal fuel efficiency gain by use of the device. The user would use steps a. and b. of the first above described procedures. It is estimated that it takes 5 minutes to move the cavities from the deployed state and the retracted state.

The illustrative embodiments and modifications thereto described hereinabove are merely exemplary. It is understood that other modifications to the illustrative embodiments will readily occur to persons of ordinary skill in the art. All such modifications and variations are deemed to be within the scope and spirit of the present invention as will be defined by the accompanying claims.

We claim:

1. A method for reducing drag of a vehicle, comprising:
 providing a pair of devices each having a frustum shape with an aft facing open area or cavity with panels sealed together when in a deployed position;
 coupling each device to a supporting member,
 using said supporting members,
 mounting each said device on to an aft portion of a vehicle body; and
 further comprising:
 coupling a base panel to each said supporting member,
 coupling four panels to said base panel,
 sealing an interface between each of said four panels and said base panel; and
 sealing an interface between each of said four panels to an adjacent panel of said four panels.

2. The method of claim 1 further comprising folding said pair of devices into a substantially flat collapsed position onto the vehicle aft position.

3. The method of claim 2 further comprising: rotating each said collapsed device cavity about a line near, or at a centerline of said vehicle body, along the opening edge of one or more rear doors; and
 swinging said collapsed cavity device with said door to lie in a retracted position alongside the vehicle.

4. The method of claim 1 further comprising:
 using ordinary bulb type seals, locking seals or other breakable seals.

5. The method of claim 1 wherein said four panels comprise:
 a vertical outside panel;
 a vertical inside panel;
 two other panels;
 all of which cooperate with said base panel to form an open face area.

6. The method of claim 5 comprising:
 mounting said inside panel normal to said base panel.

7. The method of claim 5 comprising:
 mounting said outside panel and said two other panels to said base panel at an angle less than normal with respect to said base so as to produce said open area with a smaller foot print than said base panel.

8. The method of claim 5 comprising: mounting said outside panel and said two other panels at an angle between 0 degrees and 35 degrees with respect to said base panel.

9. The method of claim 5 comprising:
mounting said outside panel and a first of said two other panels are mounted at an angle of approximately 15 degrees with respect to said base panel.

10. The method of claim 5 wherein a second of said two other panels is mounted at an angle of approximately 7 degrees with respect to said base panel.

11. The method of claim 5 further comprising:
hinging and sealing said base panel to said outside panel;
hinging and sealing said base panel to said inside panel;
hinging and sealing said base panel to said two other panels; and
sealing said outside panel and said inside panel to said two other panels.

12. The method of claim 5 wherein said panels are made of a light rigid material.

13. The method of claim 12, wherein said material is a composite fiber.

14. The method of claim 12, wherein said material is a rigid plastic material.

15. The method of claim 12, wherein said material is carbon fiber.

16. The method of claim 12, wherein said material is aluminum.

17. The method of claim 12, wherein said material is wood.

18. The method of claim 2 further comprising:
unfolding said pair of devices from a substantially flat collapsed position;
returning said cavities into said deployed position; and
operating said vehicle with said cavities in said deployed position.

19. The method of claim 18 further comprising:
resealing said seals when each said device is put into said deployed position.

20. The method of claim 3 further comprising:
returning said collapsed devices from said retracted position to said aft portion of said vehicle body.

21. A method for reducing drag of a vehicle, comprising:
providing a pair of devices each having a frustum shape with an aft facing open area or cavity with panels sealed together when in a deployed position;
coupling each device to a supporting member,
mounting each said pair of supporting member(s) on to an aft portion of a vehicle body; further comprising folding said pair of devices into a substantially flat collapsed position on to the vehicle aft position; and
rotating each said collapsed device cavity about a line near, or at, a centerline of said vehicle body along the opening edge of one or more rear docks; and
swinging said collapsed cavity device with said door to lie in a retracted position alongside the vehicle.

22. The method of claim 21 comprising:
sealing each said panel to an adjacent panel.

23. The method of claim 22 further comprising:
using ordinary bulb type seals, locking seals or other breakable seals.

24. The method of claim 21 wherein each device comprises:
coupling a base panel to said supporting member;
coupling four panels to said base panel;
sealing an interface between each of said four panels and between each of said four panels and said base panel; and
sealing an interface between each of said four panels to an adjacent panel of said four panels.

25. The method of claim 24 wherein said four panels comprise:
a vertical outside panel;
a vertical inside panel; and
two other panels;
all of which cooperate with said base panel to form an open face area.

26. The method of claim 25 comprising:
mounting said inside panel normal to said base panel.

27. The method of claim 25 comprising:
mounting said outside panel and said two other panels to said base panel at an angle less than normal with respect to said base so as to produce said open area with a smaller footprint than said base panel.

28. The method of claim 25 comprising:
mounting said outside panel and said two other panels at an angle between 0 degrees and 35 degrees with respect to said base panel.

29. The method of claim 25 comprising:
mounting said outside panel and a first of said two other panels are mounted at an angle of approximately 15 degrees with respect to said base panel.

30. The method of claim 25 wherein a second of said two other panels is mounted at an angle of approximately 7 degrees with respect to said base panel.

31. The method of claim 25 further comprising:
hinging and sealing said base panel to said outside panel;
hinging and sealing said base panel to said inside panel;
hinging and sealing said base panel to said two other panels; and
sealing said outside panel and said inside panel to said two other panels.

32. The method of claim 21 wherein said panels are made of a light rigid material.

33. The method of claim 32, wherein said material is a composite fiber.

34. The method of claim 32, wherein said material is a rigid plastic material.

35. The method of claim 32, wherein said material is carbon fiber.

36. The method of claim 32, wherein said material is aluminum.

37. The method of claim 32, wherein said material is wood.

38. The method of claim 22 further comprising: folding said pair of devices into a substantially flat collapsed position on to the vehicle aft position; and
leaving said folded pair of device on said aft position.

39. The method of claim 1 wherein said frustum shape is such that each panel makes an angle with sides of said attached vehicle to create a narrower profile as one moves aft.

40. The method of claim 21 wherein said frustum shape is such that each panel makes an angle with sides of said attached vehicle to create a narrower profile as one moves aft.

* * * * *